Aug. 23, 1966          R. H. BAUMAN          3,268,038
DIFFERENTIAL AREA WHEEL CYLINDER FOR ANTI-SKID
Filed Aug. 13, 1964                       2 Sheets-Sheet 1

INVENTOR.
ROBERT H. BAUMAN
BY
D. D. McGraw
ATTORNEY

Aug. 23, 1966   R. H. BAUMAN   3,268,038
DIFFERENTIAL AREA WHEEL CYLINDER FOR ANTI-SKID
Filed Aug. 13, 1964   2 Sheets-Sheet 2
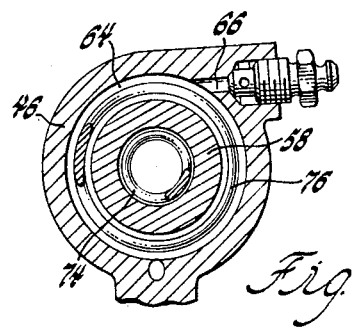
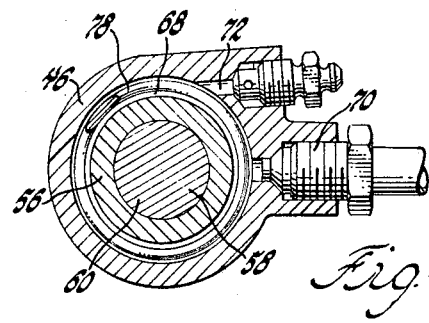
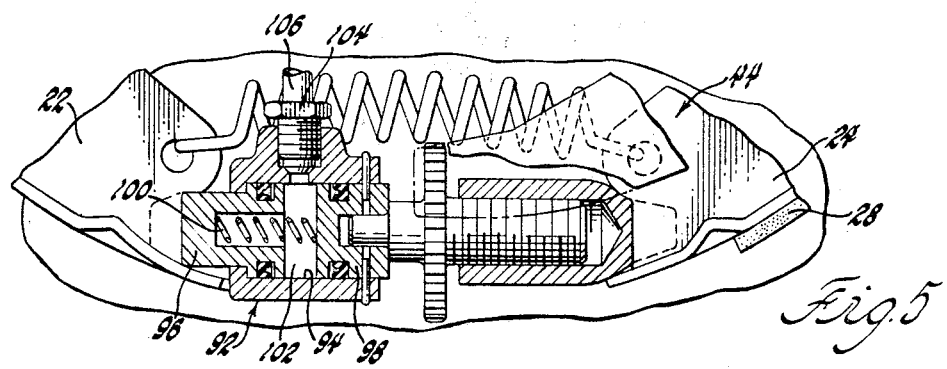
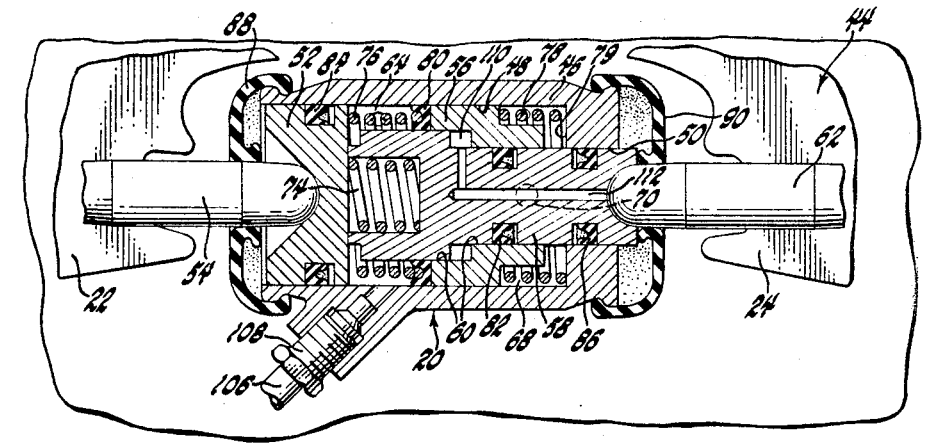
INVENTOR.
ROBERT H. BAUMAN
BY
D. D. McGraw
ATTORNEY United States Patent Office 3,268,038
Patented August 23, 1966

3,268,038
DIFFERENTIAL AREA WHEEL CYLINDER
FOR ANTI-SKID
Robert H. Bauman, Dayton, Ohio, assignor to General Motors Corporation, Detroit, Mich., a corporation of Delaware
Filed Aug. 13, 1964, Ser. No. 389,246
2 Claims. (Cl. 188—152)

This invention relates to vehicle hydraulic braking systems and more particularly to mechanism for multiplying the force from a power source exerted during the actuation of vehicle brakes.

In vehicle braking systems of common design, a wheel cylinder is usually provided which consists of a pair of internally disposed pistons responsive to hydraulic pressure put on the wheel cylinder. In such an arrangement, no force multiplication takes place but equal force distribution in two directions from the point of force input is communicated to brake shoes. It is desirable in such a system to multiply the force exerted by the brake actuator through the hydraulic medium so that a force multiplication takes place and less actuating force is necessary to actuate the vehicle brakes. Power booster systems of various types are common in the art but are external to the vehicle wheel brakes and generally work in conjunction with the hydraulic master cylinder. This invention provides a novel means for multiplying the force exerted on the brake shoes by means integral to the wheel braking apparatus.

Vehicle braking systems as presently designed also utilize the servo action generated by the brake shoes coming into contact with a rotating drum to carry out other functions such as providing the automatic adjusting of the vehicle brakes. It is desirable in the operation of vehicle brakes to utilize the force generated by the servo action to provide a braking assist. It is characteristic of vehicle braking systems having a servo action that the force generated during this action is possible only during times when rolling friction is encountered and a force is thereby generated between the two relatively moving objects, viz., the tire and a road surface. However, as the brake drum and shoes become locked together, rolling friction no longer is possible and the servo action ceases. This mechanical principle is utilized in the present invention to provide an anti-skid device for the vehicle.

It is an object of the present invention to provide an improved braking mechanism for vehicle brakes wherein applied force is multiplied for the actuation of the vehicle brakes by use of differential area pistons in the wheel cylinder.

It is another object of the present invention to provide an improved vehicle braking system wherein the servo action generated by the brakes during actuation is utilized to intensify the applied force as well as providing an anti-skid device for the brakes.

It is still another object of the present invention to provide an improved mechanism for the actuation of vehicle brakes wherein an applied force is intensified for application to expandable brake shoes, and apparatus utilized for bringing about the force intensification is contained entirely within the vehicle wheels.

It is a further object of the present invention to provide an improved force multiplying mechanism for the application of vehicle brakes which utilizes differential area pistons to intensify the force exerted on opposed ends of expandable brake shoes and utilizers an auxiliary cylinder disposed at the opposite ends of the expandable brake shoes to utilize the servo action of the brakes to assist in the actuation of the vehicle brakes while friction exists between the brake shoes and the brake drums and thereafter provides an anti-skid device for the vehicle.

Further objects and advantages of the present invention will be apparent from the following description, reference being had to the accompanying drawings wherein preferred embodiments of the present invention are clearly shown.

In the drawings:

FIGURE 3 is a sectional view taken along line 3—3 of FIGURE 2;

FIGURE 4 is a sectional view taken along line 4—4 of FIGURE 2;

FIGURE 5 is a sectional view of the anti-skid portion of the subject invention;

FIGURE 6 is a sectional view taken along line 2—2 of FIGURE 1 illustrating another embodiment of a portion of the subject invention.

Figure 1:
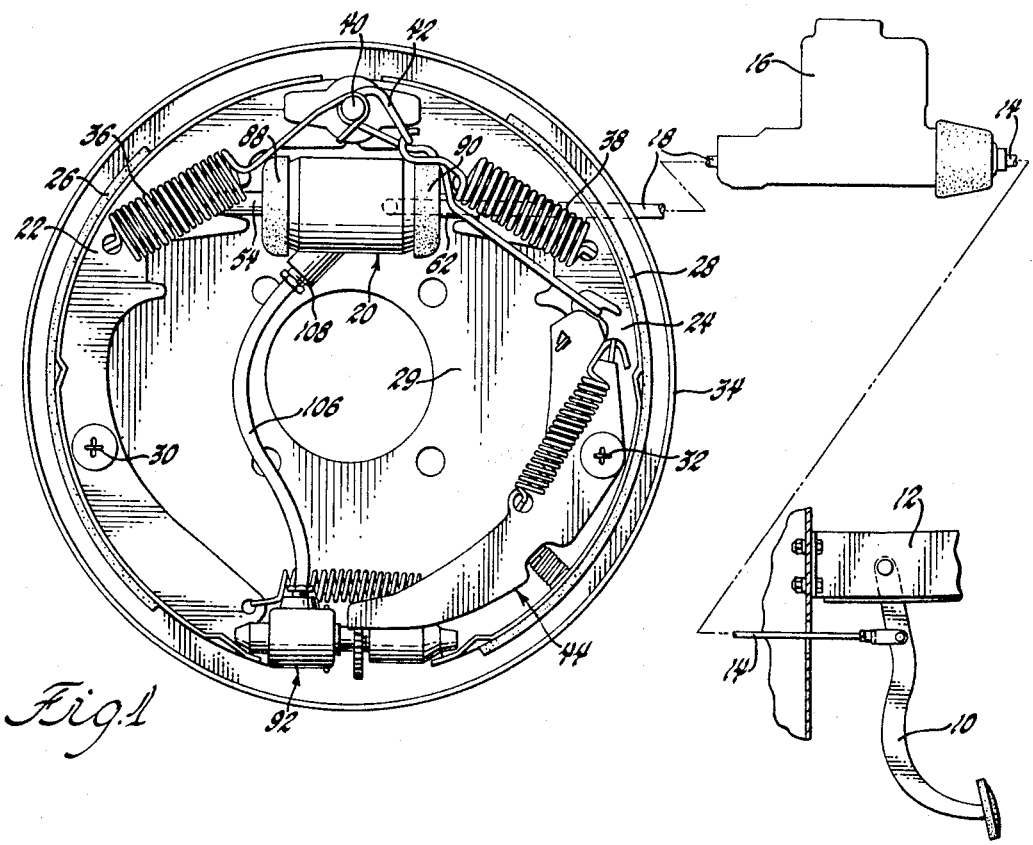
FIGURE 1 is an elevational view of a vehicle wheel braking system illustrating the subject invention therein with the other portions of the vehicle braking system shown diagrammatically.

Referring now to FIGURE 1, a brake pedal 10 is pendantly supported by a bracket 12 and adapted to drive a push rod 14 into a master cylinder 16 to provide an hydraulic pressure for a braking system. The hydraulic pressure from the master cylinder 16 is communicated through a line 18 into a wheel cylinder, generally designated by the numeral 20, the operation of whtich is to be hereinafter described.

Brake shoes 22 and 24, carrying frictional elements 26 and 28, respectively, are carried in an operative position on backing plate 29 by hold-down springs 30 and 32, respectively, in close proximity to a rotatable drum 34 carried by a wheel, not shown.

A return spring 36 has one end engaging the brake shoe 22 and its other end engaging an anchor pin 40 to maintain the brake shoe in biased engagement with the anchor pin 40. A return spring 38 has one end engaging the brake shoe 24 and its other end engaging a brake adjusting lever 42 which in turn engages the anchor pin 40 to maintain the brake shoe 24 in biased engagement with the anchor pin 40. The brake adjusting mechanism, generally designated by the numeral 44, is of the conventional type and serves to progressively place the frictional elements carried by the brake shoes in nearer proximity to the vehicle drum as the frictional elements wear during continued brake applications. This adjusting mechanism forms no portion of the subject invention.

Figure 2:
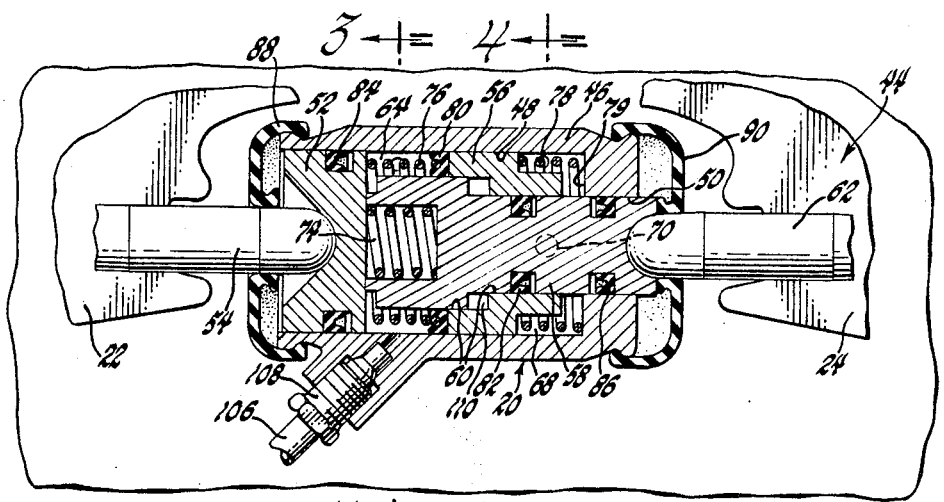
FIGURE 2 is a sectional view of the subject invention taken along line 2—2 of FIGURE 1.

Referring now to FIGURE 2, the wheel cylinder, designated by the numeral 20, generally comprises a body 46 with a bore 48 and a bore 50 formed therein. A piston 52 is slidable in the bore 48 and operatively engages a drive pin 54 connected to the brake shoe 22. The piston 52 is referred to in this application as the first piston means. A second piston 56, sometimes referred to herein as the second piston means, is likewise slidable in the bore 48 but has substantially less cross sectional area than the piston 52. A piston 58, sometimes referred to herein as the third piston means, is slidable in the bore 50 of the wheel cylinder 20 as well as being slidable in a stepped aperture 60 formed within the second piston means 56. The third piston 58 operatively engages a drive pin 62 which is arranged to engage the brake shoe 24. It is understood that the operation of the brake system described herein is of the conventional type wherein the drive pins 54 and 62 are moved in opposite directions from each other to puhs the brake shoes 22 and 24 into frictional engagement with the rotatable drum 34 to provide a braking action.

A chamber 64 is formed within the bore 48 by the disposition of the pistons 52, 56 and 58. A bleed passage 66, more clearly shown in FIGURE 3, leads from the chamber 64 and provides a means for removing the air or hydraulic fluid from the chamber. A chamber 68 is formed in the bore 48 by the relative disposition of the piston 56 and the piston 58. The chamber 68 is pressurizable through an inlet 70 which communicates with the line 18 from the master cylinder 16. A bleed passage 72 is provided from the chamber 68 in order to remove air or hydraulic fluid from this passage at appropriate times during the operation of the vehicle. The end of the inlet 70 is visible in phantom in FIGURE 2.

A spring 74 biases the pistons 52 and 58 against the pins or rods 54 and 62 and is disposed between a portion of the piston 58 and the face of the piston 52. A spring 76 and a spring 78 are disposed on either side of the piston 56 and serve to maintain the piston 56 in centered disposition relative to the face of the piston 52 and a wall 79 of the wheel cylinder 20. Seals 80 and 82 are disposed against the bore and an outer portion of the piston 58 corresponding to the aperture 60, thereby preventing the casual passage of hydraulic fluid between the chambers 64 and 68. Piston seal 84 is peripherally disposed on piston 52 and bears against the bore 48 in order to prevent the passage of hydraulic fluid past piston 52 to the atmosphere. A piston seal 86 is peripherally disposed on a portion of the piston 58 and bears against the bore 50 to prevent the casual passage of hydraulic fluid to the atmosphere past the bore 50. Rubber boots 88 and 90 are circumferentially disposed about either end of the wheel cylinder 20 in order to prevent the passage of foreign material into the operative portions of the wheel cylinder 20.

Referring now to FIGURE 5, a brake adjusting device of the expandable variety is provided between the lower ends of the brake shoes 22 and 24 and functions in a manner well known to the art. Disposed between one end of the adjusting device and the lower end of the brake shoe 22 is an auxiliary cylinder, generally designated by the numeral 92. The cylinder 92 has a bore 94 disposed therein within which is slidably disposed a piston 96 adapted to operatively engage one end of the brake shoe 22. A plug 98 seals off the opposite end of the bore 94 from the piston 96 and is not slidable therein and operatively engages the adjusting mechanism. A return spring 100 bears against a portion of the piston 96 and the plug 98 in order to return the piston 96 to a poised position after an actuation thereof. A chamber 102 is formed between the piston 96 and the plug 98 and has an outlet 104 therefrom. The outlet 104 is in fluid communication with a line 106 that freely communicates with the chamber 64 through an inlet thereto, designated by the numeral 108. It is therefore evident that the chamber 102 and the chamber 64 are in free communication and it is to be noted that this connection is normally unpressurized when the brakes are not applied and becomes pressurized in a manner to be hereinafter described.

Referring now to FIGURE 6, a chamber 110 that is formed between a portion of the piston 56 and the piston 52 is illustrated as being open to the atmosphere through a bleed line 112. The embodiment of the invention illustrated in FIGURE 6 is exactly the same as the embodiment in FIGURE 2 except for the addition of the bleed line 112.

In the operation of the subject device, the brake pedal 10 is pivoted in the direction of the master cylinder 16 by foot pressure exerted by a vehicle operator. The pressure output of the hydraulic master cylinder 16 is transmitted through the line 18 to the wheel cylinder 20.

Referring now to FIGURE 2, the chamber 68 is pressurized through the inlet 70 from the master cylinder. As the pressure therein increases, the piston 56 is moved leftwardly, as viewed in FIGURE 2, against the compression of the spring 76. As previously stated, trapped hydraulic fluid exists in the chamber 64 and the chamber 64 is therefore pressurized by the piston 56 moving into it. By way of example, and in order to simplify the explanation of operation of the mechanism, the effective flat plate area moving into the chamber 64 represented by the piston 56 is given a value of 0.25 square inch. The effective surface area of the piston 52, responsive to a build-up in the chamber 64, is given a value of 1 square inch and the effective area in the chamber 64 of the piston 58 is given a value of 0.75 square inch. In this analysis, it will also be assumed that the input pressure from the master cylinder 16 is 400 p.s.i. When the mechanism is so designed, the area of the piston 56 that is responsive to input pressure in the chamber 68 is 0.50 square inch. With 400 pounds per square inch input pressure into chamber 68, 0.50 square inch of surface area is responsive to pressure. Therefore, the piston 56 is moved to the left, as viewed in FIGURE 2, by an effective force of 200 pounds. This 200 pound force is exerted over a 0.25 square inch area into the chamber 64 and, therefore, 200 pounds of force is felt in that chamber. This 200 pounds of force over the 0.25 square inch area gives 800 p.s.i. of pressure against the piston 52 which tends to drive the piston and a push rod 54 against the brake shoe 22. Correspondingly, the surface area of the piston 58 was assumed to be 0.75 square inch; therefore, 200 pounds input over 0.25 square inch area against 0.75 square inch area of the piston 58 results in an output of 600 p.s.i. from the piston 58 against the push rod 62. It is therefore seen that, with 400 p.s.i. input into the wheel cylinder 20, 800 p.s.i. output against the push rod 54 and 600 p.s.i. output against the push rod 62 has resulted.

Referring now to FIGURE 5, the brake shoe 22 is assumed to have come into contact with a brake drum rotating in a counterclockwise manner. Therefore, the servo action generated by the rotating drum as it contacts the brake shoe 22 will drive the brake shoe 22 likewise in a counterclockwise direction. This movement of the brake shoe 22 will be felt against the brake shoe 24 in a conventional manner through the auxiliary wheel cylinder 92. Therefore, it is obvious that a pressure will also be felt in the chamber 102. As long as the tire is responsive to rolling friction, this pressure is considerably greater than the pressure in chamber 64. The conduit 106 is provided which connects the chamber of the auxiliary cylinder 92 with the chamber 64 and feeds this greater pressure into the chamber, thus using the servo action to increase the effective pressure acting on pistons 52 and 58. For example, it has been found that approximately 6,000 pounds of force may be exerted between the lower ends of the primary and secondary brake shoes which correspond in this example to brake shoes 22 and 24, respectively. Piston 96 having an effective area of .167 square inch would therefore create 1,000 pounds of pressure. Since, in our above analysis, chamber 64 was subjected to 800 pounds of pressure by the master cylinder acting through the piston 56, this increase in pressure would be transmitted to the chamber 64 by the build-up of pressure in chamber 102. This would therefore cause a further force multiplication for effective force output from the chamber 64. Other size and pressure relationships than those discussed above by way of example may be used without departing from the invention.

When the vehicle wheel reaches a sliding condition, the pressure against the piston 96 decreases quickly since resistance to sliding friction is much lower than rolling friction and the force exerted between the primary and secondary shoes therefore decreases. This decrease in pressure affects the pressure in chamber 64 in a manner decreasing the brake applied pressure acting on pistons 52 and 58. The brake is therefore released to some extent which permits the wheel to resume a rolling friction condition instead of a sliding friction condition. This response of the auxiliary cylinder 92 to the servo action of the brakes brings about an anti-skid mechanism effective in releasing brake pressure to an affected wheel when the brake shoes are locked relative to the brake drum.

When the brakes are released and pressure is relieved in the master cylinder 16, the system becomes depressurized and the springs 76 and 78 tend to center the piston 56, and the return spring 74 repositions the pistons in the wheel cylinder. Return springs 36 and 38 operating against the brake shoes 22 and 24, respectively, center the brake shoes against the anchor pin 40, thereby exerting a force against the push rods 54 and 62 tending to drive the pistons in the wheel cylinder 20 to a poised position. With the release of the brakes, of course, the pressure in chamber 102 is relieved and the return spring 100 maintains the piston 96 in firm engagement with the seated brake shoe 22. Thereafter, the braking system herein described is poised for a reactuation.

Referring now to FIGURE 6, the piston 56 and the piston 58 form a chamber 110 which can be pressurized if there is any trapped air therein during the movement of the piston 56 in a brake apply direction. Normallly, this air can be compressed and will only slightly lower the effective output pressure to the system. However, the bleed line 112 is provided from the chamber 110 to the atomsphere past the drive pin 62, thereby preventing any pressure build-up in the chamber 110 which will adversely affect the operation of the subject device.

This invention finds utility in an operative environment wherein it operates as a wheel cylinder in a vehicle hydraulic braking system. It is evident that the force-distance relationship set up herein requires a slightly greater movement of the brake pedal 10 than would be required in a system having a pressure input equal to the pressure output. However, the added amount of fluid displacment required in such a system is minimal and will not adversely affect the efficiency of the vehicle brakes. With the automatic brake adjuster 44 in operation, the brake pedal level will be maintained at a fixed point regardless of the resulting wear in the brake linings and, therefore, the system will function as described throughout the useful life of the linings.

The added inventive features of extra force multiplication from the servo action of the brakes and the anti-skid capability of the system incorporates features usually found only in separate braking systems. As the auxiliary cylinder 92 functions, the wheel cylinder responds to the servo action of the brakes and, in this capacity, aids in the brake apply movement. The rapid decrease in pressure in this chamber, when the brake shoes become locked relative to the brake drum, adds the anti-skid feature which allows the immediate release of a locked vehicle wheel. Therefore, a brake results which, during operation thereof, has an applied force from a master cylinder multiplied for more effective braking.

While the embodiments of the present invention, as herein disclosed, constitute preferred forms, it is to be understood that other forms might be adopted.

What is claimed is as follows:

1. Force multiplying apparatus for the actuation of vehicle brakes, said vehicle brakes comprising a plurality of brake shoes carrying frictional elements thereon and adapted to be driven into frictional engagement with a rotatable drum disposed therearound, said force multiplying apparatus comprising: a pressure source; wheel cylinder means adapted to apply forces in opposite directions to drive the brake shoes into engagement with the rotatable drum; and means connecting a pressure source to the wheel cylinder means for communicating the pressure created in the pressure source; said wheel cylinder means comprising: a cylinder body having a bore therein; first piston means disposed in said bore adapted to be driven into engagement with a vehicle brake shoe; second piston means disposed in said bore and being in communication with said pressure source; and third piston means slidably disposed within said second piston means and adapted to transmit a force to another brake shoe oppositely disposed from said first-mentioned brake shoe, and a chamber wherein hydraulic fluid is disposed generally formed by one surface of the first piston means and the third piston means, said chamber being pressurizable by the application of force from the pressure source to the second pressure means whereby the first piston means and the third piston means are driven in opposition to one another in a force multiplying manner thereby bringing the brake shoes into frictional engagement with the rotatable drum with a force greater than provided to the wheel cylinder by the pressure source.

2. The force multiplying apparatus according to claim 1 wherein the wheel cylinder means includes the cylinder having a bore with a piston slidably disposed therein and responsive to the servo action generated by the vehicle brakes during a braking action whereby force is transmitted through a conduit to the first-mentioned wheel cylinder to assist in the actuation thereof.

References Cited by the Examiner

UNITED STATES PATENTS

| | | | |
|---|---|---|---|
| 1,704,762 | 3/1929 | Reynolds | 188—152 |
| 1,806,151 | 5/1931 | Dick | 188—152 |
| 1,826,824 | 10/1931 | Reynolds | 188—152 |
| 2,928,246 | 3/1960 | Sjodin | 60—54.6 X |
| 3,044,581 | 7/1962 | Lepelletier | 188—152 |
| 3,203,512 | 8/1965 | Lepelletier | 188—152 |

MILTON BUCHLER, *Primary Examiner.*

G. E. A. HALVOSA, *Assistant Examiner.*